United States Patent
Lee et al.

(10) Patent No.: US 10,774,646 B2
(45) Date of Patent: Sep. 15, 2020

(54) ROTARY ENGINE WITH OIL PUMP

(71) Applicant: LG ELECTRONICS INC., Seoul (KR)

(72) Inventors: Yunhi Lee, Seoul (KR); Byeonghun Yu, Seoul (KR); Byeongchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 15/942,832

(22) Filed: Apr. 2, 2018

(65) Prior Publication Data

US 2018/0283175 A1    Oct. 4, 2018

(30) Foreign Application Priority Data

Apr. 4, 2017    (KR) .......................... 10-2017-0043891

(51) Int. Cl.

| | |
|---|---|
| *F01C 21/04* | (2006.01) |
| *F02B 53/00* | (2006.01) |
| *F01M 1/02* | (2006.01) |
| *F01C 17/02* | (2006.01) |
| *F01M 1/06* | (2006.01) |
| *F02B 55/14* | (2006.01) |
| *F01C 1/22* | (2006.01) |

(Continued)

(52) U.S. Cl.
CPC ................ *F01C 21/04* (2013.01); *F01C 1/22* (2013.01); *F01C 13/04* (2013.01); *F01C 17/02* (2013.01); *F01M 1/02* (2013.01); *F01M 1/06* (2013.01); *F02B 53/00* (2013.01); *F02B 55/02* (2013.01); *F02B 55/14* (2013.01); *F04C 2/10* (2013.01); *F01M 2001/0238* (2013.01); *F01M 2001/0269* (2013.01); *F01M 2001/062* (2013.01); *F04C 2240/50* (2013.01)

(58) Field of Classification Search
CPC .................................. F01C 21/04; F01M 1/06
See application file for complete search history.

(56) References Cited

U.S. PATENT DOCUMENTS

| 3,872,838 A | 3/1975 | Vogelsang et al. |
|---|---|---|
| 8,523,546 B2 | 9/2013 | Shkolnik et al. |

(Continued)

FOREIGN PATENT DOCUMENTS

JP    2791571 B2    8/1998

*Primary Examiner* — Mary Davis
(74) *Attorney, Agent, or Firm* — Birch, Stewart, Kolasch & Birch, LLP

(57) ABSTRACT

A rotary engine having a crankshaft, a housing provided with lobe accommodating portions arranged to surround the crankshaft, and combustion chambers communicating with the lobe accommodating portions, a rotor rotatable eccentrically with respect to the crankshaft and provided with lobes continuously accommodated in the lobe accommodating portions, a housing cover provided with a bearing portion through which the crankshaft is inserted so as to be rotatably supported, and a lubricating unit to supply oil to the bearing portion, wherein the lubricating unit includes an oil pan to accommodate oil therein, an oil pump to pump up oil filled in the oil pan, and an oil supply passage having both ends located in the oil pump and the bearing portion, respectively, is provided. This structure may allow direct and effective lubrication of the bearing portion, and can employ a journal bearing.

17 Claims, 12 Drawing Sheets

(51) Int. Cl.
*F01C 13/04* (2006.01)
*F02B 55/02* (2006.01)
*F04C 2/10* (2006.01)

(56) References Cited

U.S. PATENT DOCUMENTS

2005/0252482 A1 11/2005 Jones
2008/0128211 A1 6/2008 Mitsubori et al.
2014/0261291 A1* 9/2014 Garside .................... F01C 1/22
123/200

* cited by examiner

ROTARY ENGINE WITH OIL PUMP

CROSS-REFERENCE TO RELATED APPLICATION

Pursuant to 35 U.S.C. § 119(a), this application claims the benefit of an earlier filing date of and the right of priority to Korean Application No. 10-2017-0043891, filed on Apr. 4, 2017, the contents of which are incorporated by reference herein in its entirety.

BACKGROUND OF THE INVENTION

1. Field of the Invention

The present invention relates to a rotary engine producing driving force by a rotary motion.

2. Description of the Related Art

A rotary engine is an engine producing driving force by a rotary motion, and was first invented by Felix Wankel.

A Wankel engine includes a housing having an inner surface in a shape of an epitrochoidal curve, and a rotor having a triangular shape rotating within the housing. An inner space of the housing is divided into three spaces by the rotor. As volumes of those spaces change in response to the rotation of the rotor, four strokes such as intake→compression→explosion→exhaust are executed in a continuous manner. In the Wankel engine, each stroke is executed three times and an eccentric shaft rotates three times for one rotation of the rotor.

After the invention of the Wankel engine, various studies for optimizing the design of the Wankel engine have been conducted, and shape-varied rotary engines are also under development.

The rotary engine is a high performance engine in view of facilitating size reduction owing to a simple structure and exhibiting high performance or high output during a high-speed operation. By virtue of those advantages, the rotary engine is effectively applicable to various devices, such as a heat pump system, a vehicle, a bicycle, an aircraft, a jet ski, an electrical chain saw, a drone and the like.

In addition, the rotary engine generates less vibration and noise resulting from a uniform rotational force, and emits less NOx. However, as the rotary engine has a wider surface area than a stroke volume, an extinction area increases. Accordingly, the rotary engine emits a large quantity of unburned hydrocarbon (UHC) and causes lowered fuel efficiency and operation efficiency.

Particularly, the related art rotary engine employs a ball bearing or needle bearing in order to rotatably support a crankshaft which is rotated by driving force generated. Since this bearing is installed in a manner that an outer ring and an inner ring are fixed to a housing side and a crankshaft side, respectively, the bearing is difficult to be replaced and has a limitation in a load that they can support.

In order to increase a size of the rotary engine and improve reliabilities of components of the rotary engine, it may be considered to mount a bearing, such as a journal bearing, which are configured to be surface-contactable. At this time, in the journal bearing method, it is important to apply lubricant to a journal surface. However, the related art method has been configured such that oil is also introduced at a predetermined ratio into a mixture of air and fuel. This method has a problem in that the oil is not supplied to a portion where the mixture is not provided, and has a constraint that the journal bearing is difficult to be applied.

In addition, in implementing a lubrication system, an integrated system can be realized to supply oil even to a gear structure for an eccentric rotation and a sealing structure as well as the bearing. Furthermore, it is desirable to implement a circulation system that can prevent a leakage of the oil supplied to each component, and recover and re-supply oil used for lubrication.

SUMMARY OF THE INVENTION

A first aspect of the present invention is to provide a rotary engine having a lubricating unit, capable of supplying oil to a bearing portion separately from a mixture, so that a journal bearing can be applied even to a position which is not exposed to the mixture.

A second aspect of the present invention is to provide a rotary engine having an integrated lubricating unit, capable of supplying oil even to a gear portion guiding an eccentric rotation of a rotor.

A third aspect of the present invention is to provide a rotary engine having a lubricating unit, which is configured to recover and circulate oil used for lubrication of a bearing portion and the like.

To achieve the first aspect of the present invention, as embodied and broadly described herein, a rotary engine may include a crankshaft, a housing provided with a plurality of lobe accommodating portions arranged to surround the crankshaft, and combustion chambers, a rotor rotatable eccentrically with respect to the crankshaft, and provided with lobes continuously accommodated in the lobe accommodating portions, respectively, a housing cover provided with a bearing portion rotatably supporting the crankshaft, and a lubricating unit to supply oil to the bearing portion. The lubricating unit may include an oil pan to accommodate oil therein, an oil pump to pump up oil filled in the oil pan, and an oil supply passage through which the oil pump and the bearing portion are connected to each other.

To achieve the second aspect of the present invention, a rotary engine according to the present invention may include a crankshaft, a housing provided with a plurality of lobe accommodating portions arranged to surround the crankshaft, and combustion chambers, a rotor rotatable eccentrically with respect to the crankshaft and provided with lobes continuously accommodated in the lobe accommodating portions, a housing cover coupled to the housing to cover the lobe accommodating portions and provided with a guide gear having saw teeth on an inner circumferential surface thereof, a rotor gear disposed to be fixed to the rotor and provided with a gear portion engaged with the guide gear, and a lubricating unit provided with a gear passage along which oil is supplied to the guide gear.

To achieve the third aspect of the present invention, a rotary engine according to the present invention may include a crankshaft, a housing provided with a plurality of lobe accommodating portions arranged to surround the crankshaft, and combustion chambers, a rotor rotatable eccentrically with respect to the crankshaft and provided with lobes continuously accommodated in the lobe accommodating portions, a housing cover rotatably supporting the crankshaft, and a lubricating unit to supply oil to a surrounding of the crankshaft. The lubricating unit may include an oil pan formed to accommodate oil therein, an oil pump to pump up oil filled in the oil pan, an oil supply passage along which oil is supplied from the oil pump to the surrounding of the crankshaft, and an oil recovery passage along which oil is recovered from the surrounding of the crankshaft to the oil pan.

According to the present invention having such configuration described above, the following effects can be obtained.

First, in a rotary engine according to the present invention, a lubricating unit can supply oil to a bearing portion. Accordingly, unlike the related art case where oil for lubrication is added to a mixture of fuel and air and supplied to an intake side, oil can be effectively supplied directly to the bearing portion. In addition, oil which is contained in the mixture and subjected to intake, combustion, and exhaustion can be reduced, which may result in improving efficiency of the engine.

Further, since the lubricating unit is provided, a journal bearing can be applied to the bearing portion of the present invention. Since the journal bearing provides a wider contact area than that of the related art ball bearing, the rotary engine according to the present invention can be made larger in size and larger in capacity. Further, the bearing portion of the present invention made of the journal bearing can be easily replaced and have extended lifespan.

The lubricating unit of the present invention can be formed by an oil storage cover in which an oil pump is mounted on an intake-side cover and an oil pan is fixed to the intake-side cover. That is, since the lubricating unit is integrally formed with a housing and a housing cover, a structure of the rotary engine provided with the lubricating unit can be simplified.

Further, since the oil pump is implemented as a trochoid pump rotatably connected to the crankshaft, the oil pump can be driven without any separate driving means, and in particular, can be operated to be variable according to an output of the engine.

On the other hand, an oil supply passage can be formed by a combination of a housing passage and a supply tube. Oil can be cooled by heat-exchange with external air while passing through the supply tube, and thereafter flow along the housing passage so as to cool internal components of the rotary engine according to the present invention.

Further, the oil supply passage may include an axial passage that penetrates through the crankshaft. Accordingly, oil can be supplied to bearing portions of an intake side cover and an exhaust-side cover, respectively, through the housing passage located at one place.

The lubricating unit of the rotary engine according to the present invention can supply oil to an eccentric bearing that supports a rotor which eccentrically rotates. Particularly, the eccentric bearing can be lubricated by oil supplied through an axial passage communicating with the housing passage, thereby implementing an integrated lubrication system. In addition, the crankshaft and the rotor can be cooled by oil flowing along the axial passage.

Second, a lubricating unit of the present invention can directly supply oil to a guide gear for guiding an eccentric rotation of a rotor, and a gear portion. As a result, abrasion and noise due to engagement between saw teeth of the guide gear and the gear portion can be effectively reduced.

A housing cover of the rotary engine according to the present invention may be provided with a sealing groove and an oil sealing member. Therefore, it may be possible to restrict oil, which is supplied to the bearing portion or the guide gear, from being mixed with a mixture due to being leaked into lobe accommodating portions.

In addition, the lubricating unit of the present invention can supply oil directly to a button seal, so as to reduce a frictional loss between the button seal and lobes and further ensure a restriction of a leakage of mixture and exhaust gas.

Third, a lubricating unit of the present invention may include an oil recover passage through which oil supplied to the bearing portion and the like is recovered. Specifically, oil may be guided to flow into an oil pan from a housing cover or recovered into the oil pan through a recovery tube via an outside. This may result in efficiently using oil for lubrication in a circulating manner and additionally reducing possibility that oil is scattered to mixture or exhaust gas.

DETAILED DESCRIPTION OF THE PREFERRED EMBODIMENT

Hereinafter, a rotary engine according to the present invention will be described in detail with reference to the drawings.

In describing the present invention, if a detailed explanation for a related known function or construction is considered to unnecessarily divert the gist of the present disclosure, such explanation has been omitted but would be understood by those skilled in the art.

The accompanying drawings are used to help easily understand the technical idea of the present invention and it should be understood that the idea of the present invention is not limited by the accompanying drawings. The idea of the present disclosure should be construed to extend to any alterations, equivalents and substitutes besides the accompanying drawings.

Figure 1:
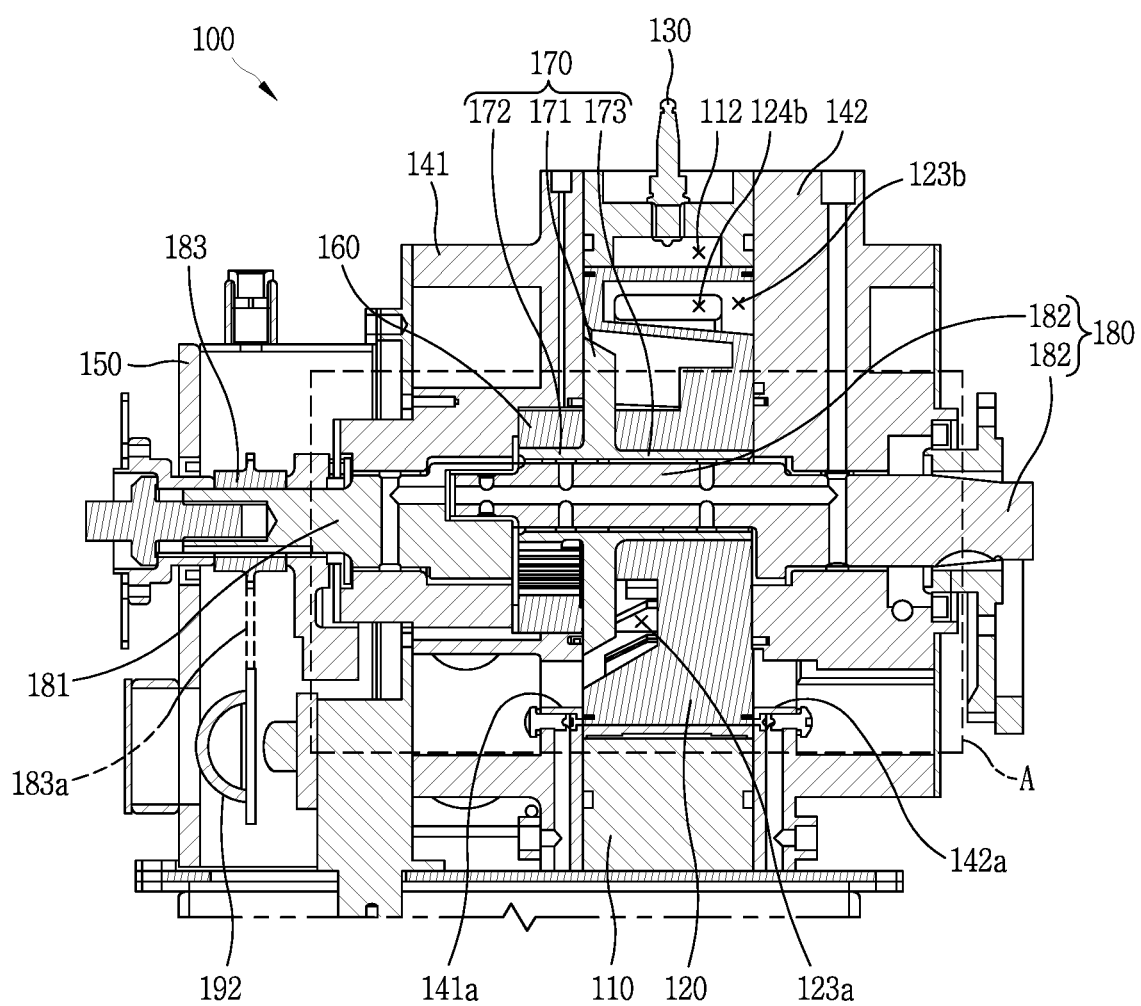
FIG. 1 is a longitudinal sectional view of a rotary engine according to the present invention.
Figure 2:
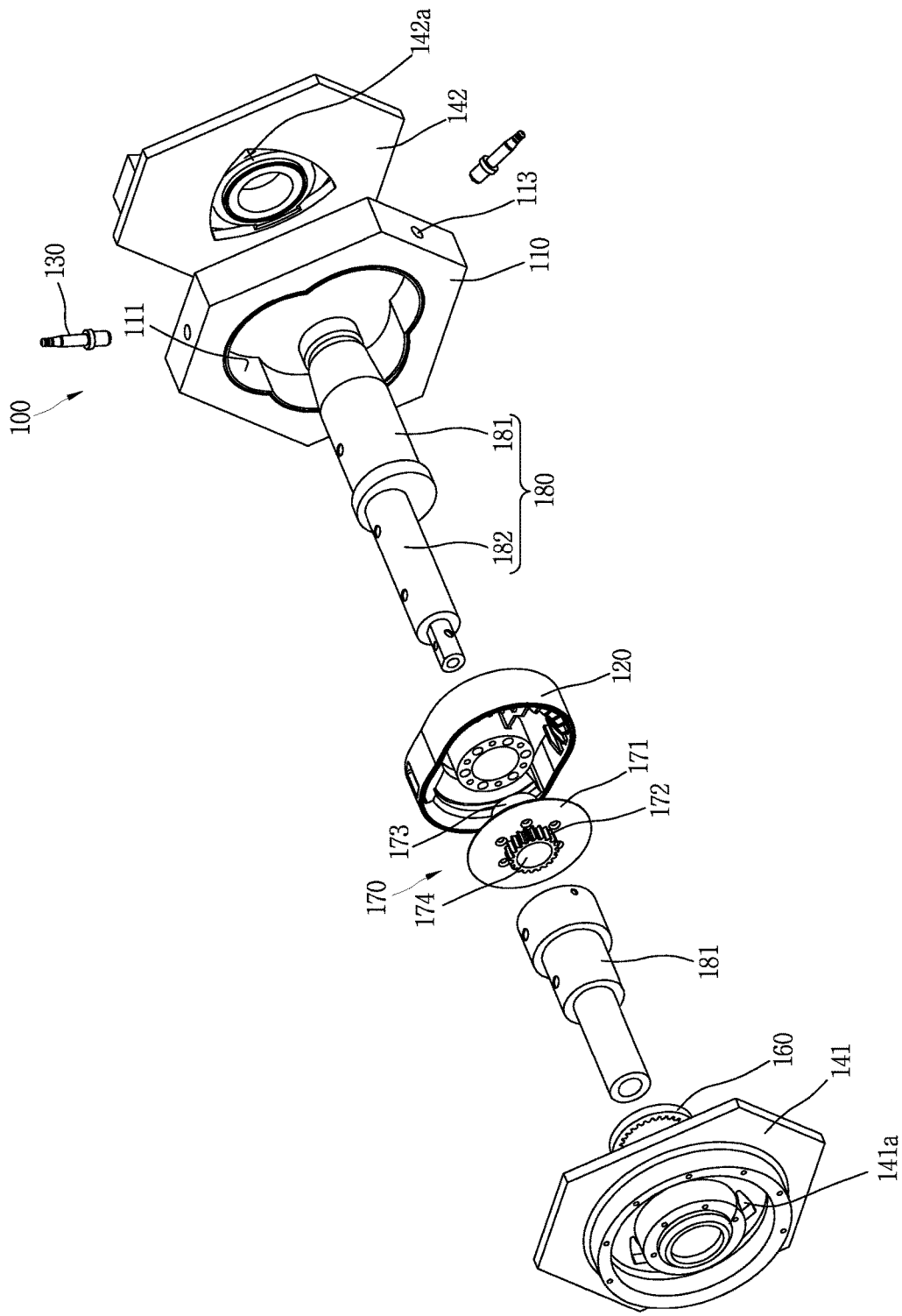
FIG. 2 is an exploded perspective view illustrating some components of the rotary engine illustrated in FIG. 1.
Figure 3:
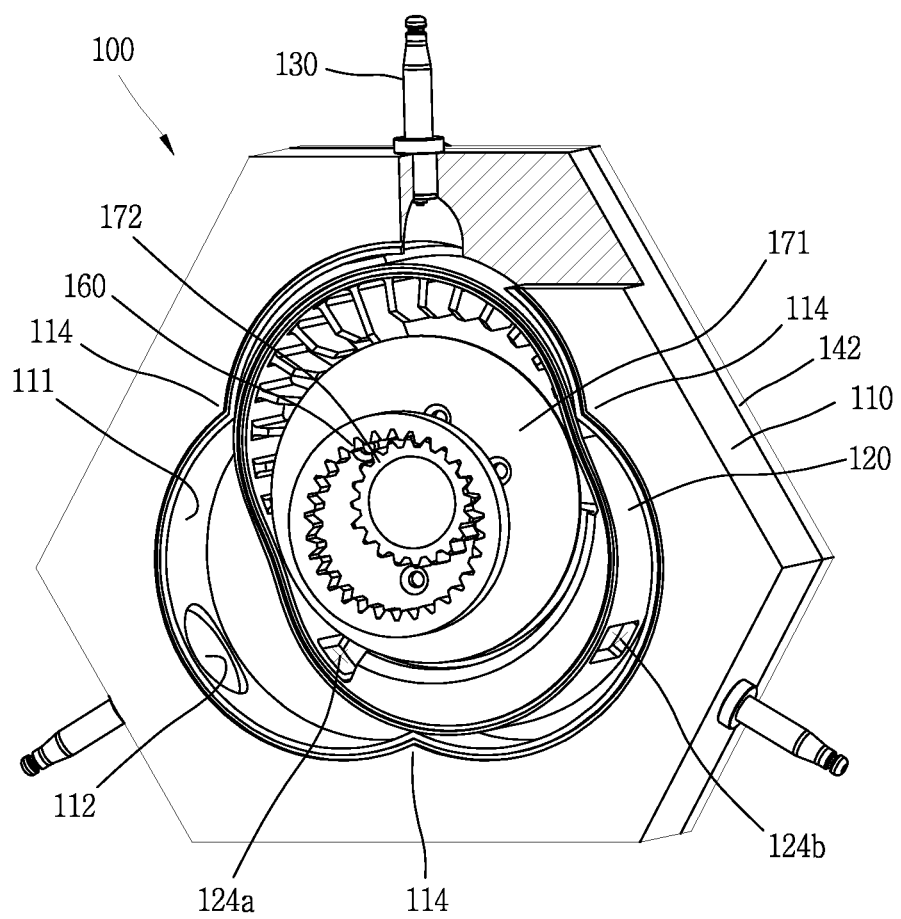
FIG. 3 is a conceptual view illustrating an internal structure of the rotary engine illustrated in FIG. 1.
Figure 4A:
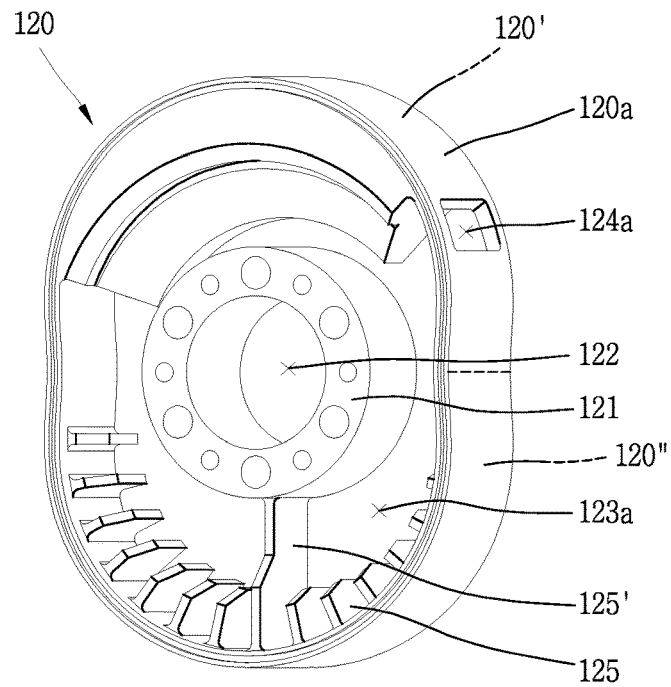
FIGS. 4A and 4B are perspective views of a rotor illustrated in FIG. 1, viewed from different directions.
Figure 4B:
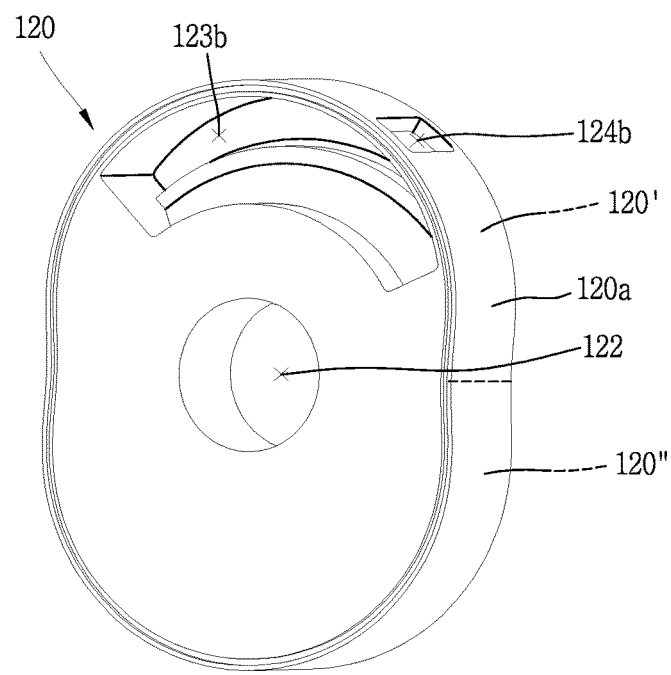

FIG. 1 is a longitudinal sectional view of a rotary engine according to the present invention, and FIG. 2 is an exploded perspective view illustrating some components of the rotary engine illustrated in FIG. 1. FIG. 3 is a conceptual view illustrating an internal structure of the rotary engine illustrated in FIG. 1, and FIGS. 4A and 4B are perspective views of a rotor illustrated in FIG. 1, viewed from different directions.

A rotary engine 100 according to one embodiment disclosed herein is configured in a manner that volumes of N operation chambers formed between a housing 110 and a rotor 120 change, in response to an eccentric rotation of the rotor 120 within the housing 110, and four strokes of intake→compression→explosion→exhaust are consecutively executed during the change. A crankshaft 180 rotates in response to the eccentric rotation of the rotor 120, and is connected to another component so as to transfer driving force generated.

Referring to FIGS. 1 and 2, the rotary engine 100 of the present invention includes a housing 110, an ignition plug 130, a rotor 120, housing covers 141 and 142, a rotor gear 170, and a crankshaft 180.

First, the housing 110 is provided with N lobe accommodating portions 111 therein (here, N is a natural number equal to or greater than 3). This embodiment exemplarily illustrates an example that three lobe accommodating portions 111 (i.e., N=3) are provided. Shapes of the lobe accommodating portion 111 and lobes 120' and 120" to be described later may be designed based on an epitrochoid curve which is a track drawn by an arbitrary point existing on a rolling circle in response to a rotation of the rolling circle when the rolling circle moving while rotating is present on an arbitrary shape.

On an upper central portion of each of the N lobe accommodating portions 111 is provided with a combustion chamber 112 that communicates with the lobe accommodating portion 111 (i.e., N combustion chambers 112 are provided). Referring to FIG. 3, the combustion chamber 112 has a shape recessed into an inner wall of the housing 110 that forms the lobe accommodating portion 111. A size of the combustion chamber 112 is differently designed according to a compression ratio of the rotary engine 100.

The ignition plugs 130 are provided on the housing 110 to emit spark to the combustion chambers 112, respectively, so as to ignite mixed gas filled in the combustion chambers 112. As illustrated, each of the ignition plugs 130 is inserted through an insertion hole 113 of the housing 110 in a manner of being exposed to an upper portion of the combustion chamber 112. The insertion hole 113 communicates with the combustion chamber 112.

Meanwhile, the rotor 120 is inserted into each of the lobe accommodating portions 111, and eccentrically rotates centering on a center of the lobe accommodating portion 111. The rotor 120 is provided with N-1 lobes 120' and 120" which are consecutively accommodated in each of the lobe accommodating portions 111.

Referring to FIGS. 4A and 4B, a supporting portion 121 on which the rotor gear 170 is mounted is provided in a central portion of the rotor 120. A through hole 122 is formed through the supporting portion 121. A crankshaft 180 inserted through the rotor gear 170 is inserted through the through hole 122. A front surface of the supporting portion 121 supports a flange portion 171 of the rotor gear 170, and coupling means such as coupling members are used to maintain a firmly-coupled state between the supporting portion 121 and the flange portion 171.

A first storage portion 123a for temporary storing the mixed air introduced through an intake side cover 141, which is one of the housing covers, is formed in a front portion of the rotor 120. The first storage portion 123a has a shape recessed from a front portion of the rotor 120 to a rear portion of the rotor 120 (i.e., in an axial direction of the crankshaft 180).

As the first storage portion 123a is formed, an edge of a portion of the rotor 120 (as illustrated, a part of the first storage portion 123a which does not share a side wall with a second storage portion 123b) is left thin, which may result in lowering rigidity of the rotor 120. Considering this, ribs 125 for reinforcing the rigidity of the rotor 120 may protrude from a plurality of points on an inner side surface of the rotor 120 forming the first storage portion 123a. In this instance, at least one rib 125' may be connected to the supporting portion 121, and have a portion with a height lower than a thickness of the rotor 120 such that the mixed gas temporarily stored in the first storage portion 123a flows to an opposite side.

An intake port 124a communicating with the first storage portion 123a is formed through a side portion of the rotor 120, such that the introduced mixed gas can be introduced into the lobe accommodating portions 111. The intake port 124a is located at a position allowing the introduction of the mixed gas while the rotor 120 rotates by 120° in a counterclockwise direction.

A second storage portion 123b in which exhaust gas generated after combustion is temporarily stored is provided in a rear portion of the rotor 120. The second storage portion 123b has a shape recessed from the rear portion of the rotor 120 toward the front portion of the rotor 120 (i.e., an axial direction of the crankshaft 180). The exhaust gas temporarily stored in the second storage portion 123b is discharged to outside through the exhaust-side housing cover 142 as one of the housing covers.

An exhaust port 124b communicating with the second storage portion 123b is formed through a side portion of the rotor 120 such that exhaust gas generated after combustion can be introduced into the second storage portion 123b. The exhaust port 124b is located at a position where the exhaust gas can be exhausted after a counterclockwise rotation of the rotor 120 by 270°, such that introduced gas can be exhausted after being more expanded to a larger amount. Such over-expansion may result in increasing efficiency of the rotary engine 100.

The intake side cover 141 is provided on the front portion of the housing 110 and the exhaust side cover 142 is provided on the rear portion of the housing 110.

The intake-side housing cover 141 is coupled to the housing 110 to cover one side of each of the lobe accommodating portions 111. A sealing member (not illustrated) is provided between the intake-side housing cover 141 and the housing 110 and the rotor 120, for airtight sealing.

The intake-side housing cover serves as a path along which the introduced mixed gas is transferred toward the rotor 120 while sealing the housing 110. To this end, the intake-side housing cover 141 is provided with an intake hole 141a that communicates with the first storage portion 123a provided in the front portion of the rotor 120.

A guide gear 160 is coupled to an inner side of the intake-side housing cover 141 that faces the lobe accommodating portions 111. The guide gear 160 has an annular shape with saw teeth along an inner circumference thereof. The guide gear 160 is configured such that the rotor gear 170 is rotated with being internally engaged therewith. Accordingly, the eccentric rotation of the rotor 120 with respect to the center of the lobe accommodating portions 111 can be guided. The number of teeth of the guide gear 160 is designed by considering a rotation ratio between the rotor 120 and the crankshaft 180 transferring driving force.

The rotor 120 is provided with the rotor gear 170 mounted thereto. The rotor gear 170 is provided with saw teeth formed along an outer circumference thereof. The rotor gear 170 rotates with being internally engaged with the guide gear 160 fixed to the intake-side housing cover 141. The number of teeth of the rotor gear 170 is designed by considering the rotation ratio between the rotor 120 and the crankshaft 180.

An accommodating portion 174 in which an eccentric portion 182 of the crankshaft 180 is inserted is formed through a central portion of the rotor gear 170. The eccentric portion 182 is rotatable within the accommodating portion 174. With the configuration, the eccentric portion 182 inserted in the accommodating portion 174 rotates in response to the eccentric rotation of the rotor 120. Structurally, a shaft portion 181 of the crankshaft 180 rotates by an N−1 round in a clockwise direction when the rotor 120 eccentrically rotates by one round in a counterclockwise direction.

As illustrated, the rotor gear 170 may include a flange portion 171 formed in a shape of a flat plate to be supported and fixed by the supporting portion 121 of the rotor 120, a gear portion 172 formed on one surface of the flange portion 171 and brought into contact with the inside of the guide gear 160, a boss portion 173 protruding from another surface of the flange portion 171 to be inserted into the through hole 122 of the rotor 120 when the flange portion 171 is mounted on the supporting portion 121 of the rotor 120, and an accommodating portion 174 formed through the gear portion 172 and the boss portion 173 such that the eccentric portion 182 of the crankshaft 180 can be inserted therethrough.

The crankshaft 180 includes a shaft portion 181 penetrating through the rotary engine 100, and an eccentric portion 182 formed eccentric from the shaft portion 181 and inserted into the accommodating portion 174 of the rotor gear 170. In this embodiment, a front part of the shaft portion 181 penetrates through the intake-side housing cover 141, and a rear part of the shaft portion 181 penetrates through the exhaust-side housing cover 142. The shaft portion 181 is connected to another system and configured to transfer driving force generated by the rotary engine 100 to the another system.

The exhaust-side cover 142 is coupled to the housing 110 to cover another side of each of the lobe accommodating portions 111. The exhaust-side cover 142 serves as a path along which the generated exhaust gas is transferred to an exhaust manifold while sealing the housing 110. To this end, the exhaust-side housing cover 142 is provided with an exhaust hole 142a communicating with the second storage portion 123b located in the rear portion of the rotor 120.

The rotary engine 100 with the structure operates through four strokes of intake-compression-explosion (expansion)-exhaust for one cycle. Hereinafter, a motion of the rotor 120 within the housing 110 for each stroke will be described.

FIGS. 5 to 8 are conceptual views illustrating the processes of intake→compression→explosion→exhaust carried out in the rotary engine 100 illustrated in FIG. 3, focusing on a rotational angle of the rotor 120. As described above, the intake port 124a and the exhaust port 124b are provided on the side portion of the rotor 120, respectively.

Figure 5:
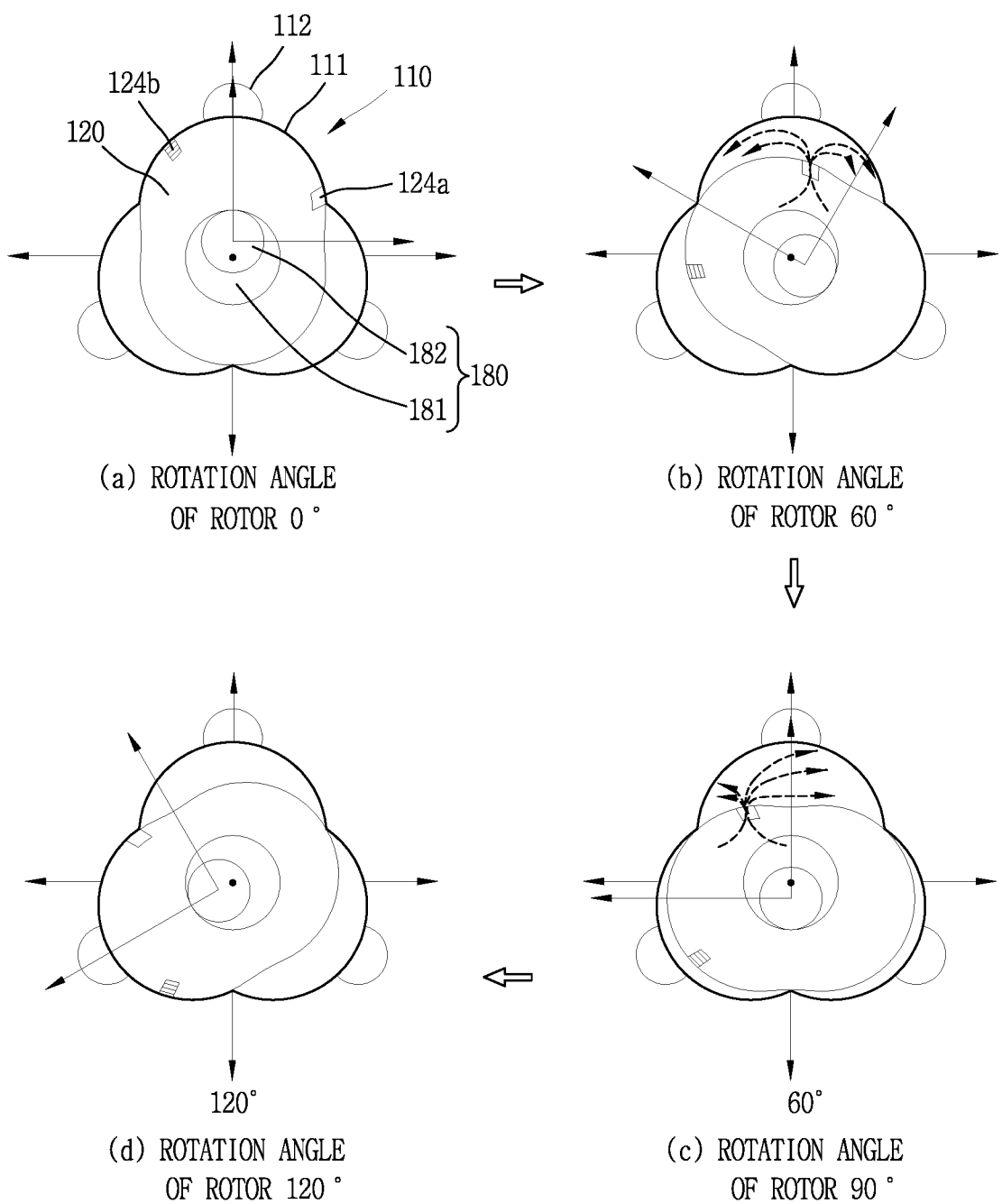
FIG. 5 is a conceptual view illustrating an intake process inside the rotary engine illustrated in FIG. 3.

First, the intake process will be described with reference to FIG. 5. The intake process is enabled by the rotor 120 that rotates within the housing 110 in a counterclockwise direction, and continued while a rotation angle of the rotor 120 changes from 0° up to 120°. While the rotor 120 rotates from 0° to 120° in the counterclockwise direction based on the drawing, mixed gas is introduced into the lobe accommodating portion 111 provided at an upper portion of the housing 110 and the combustion chamber 112 communicating with the lobe accommodating portion 111.

In this instance, as illustrated, the mixed gas is introduced the most when the rotation angle of the rotor 120 is 90°, but the rotary engine 100 according to the present invention is designed to intake the mixed gas until when the rotation angle of the rotor 120 is 120°. This is for causing overexpansion during the expansion process so as to improve efficiency of the rotary engine 100.

Figure 6:
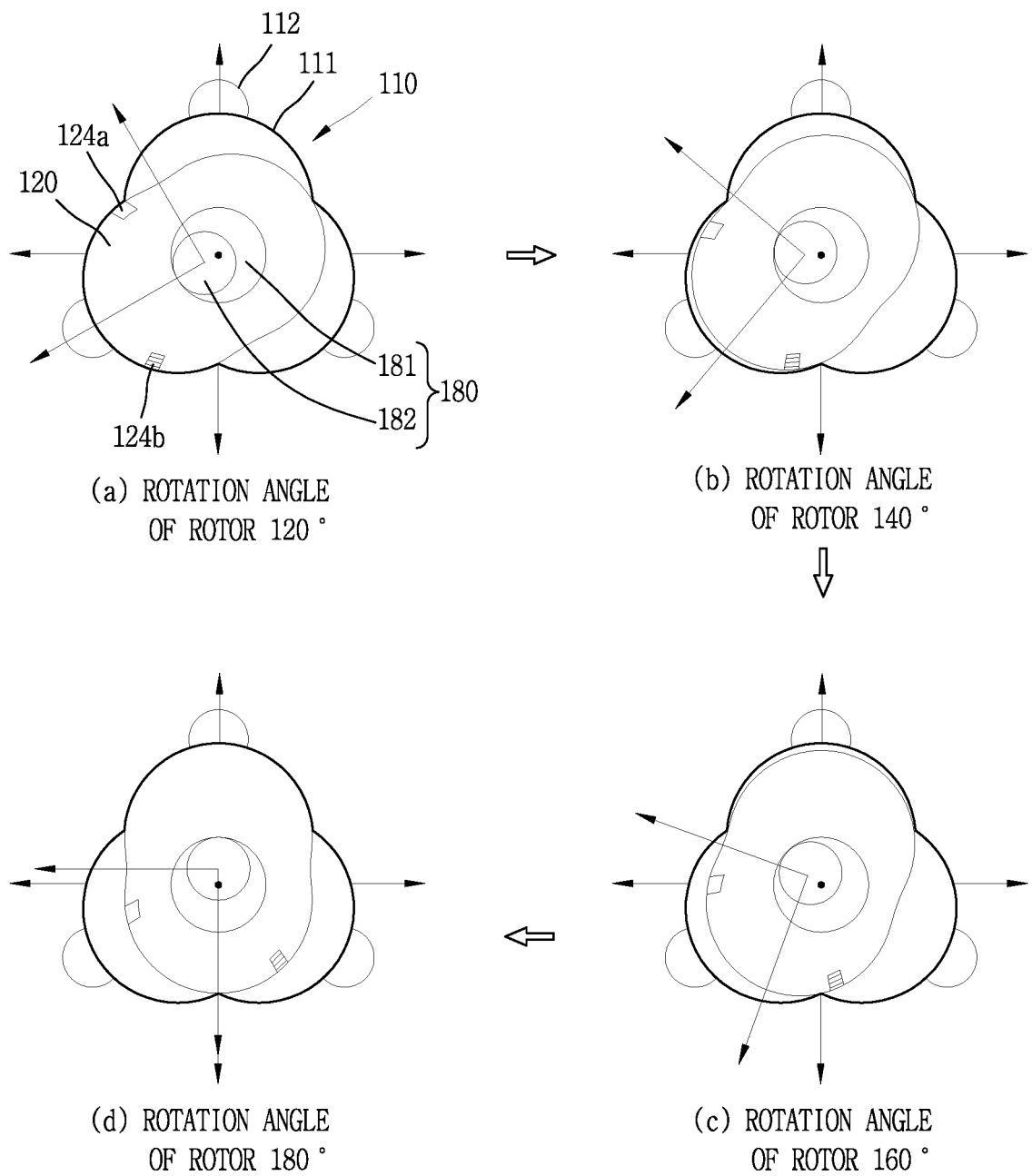
FIG. 6 is a conceptual view illustrating a compression process inside the rotary engine illustrated in FIG. 3.

Next, referring to FIG. 6, after the intake process, the mixed gas starts to be compressed by the rotation of the rotor 120. The compression process is executed while the rotation angle of the rotor 120 changes from 120° to 180°. The maximum compression ratio reaches when the rotor 120 rotates by 180°. In this instance, the mixed gas is ideally in a state of being fully filled in the combustion chamber 112.

An ignition by the ignition plug 130 is started at the end of the compression process, and the combustion process of the mixed gas is started accordingly. The combustion process is continued until the beginning of the explosion process. The combustion process is started from when the rotation angle of the rotor 120 is about 160° and completely ended when the rotation angle of the rotor 120 is about 200°.

Meanwhile, the intake process by which mixed gas is introduced into the lobe accommodating portion 111 provided at a left lower end of the housing 110 in the drawing and the combustion chamber 112 communicating with the corresponding lobe accommodating portion 111 through the intake port 124a is started. That is, the processes of intake-→compression→explosion→exhaust are consecutively executed in the lobe accommodating portion 111 which correspond to a rotating direction of the rotor 120 and the combustion chamber 112 communicating with the lobe accommodating portion 111.

Figure 7:
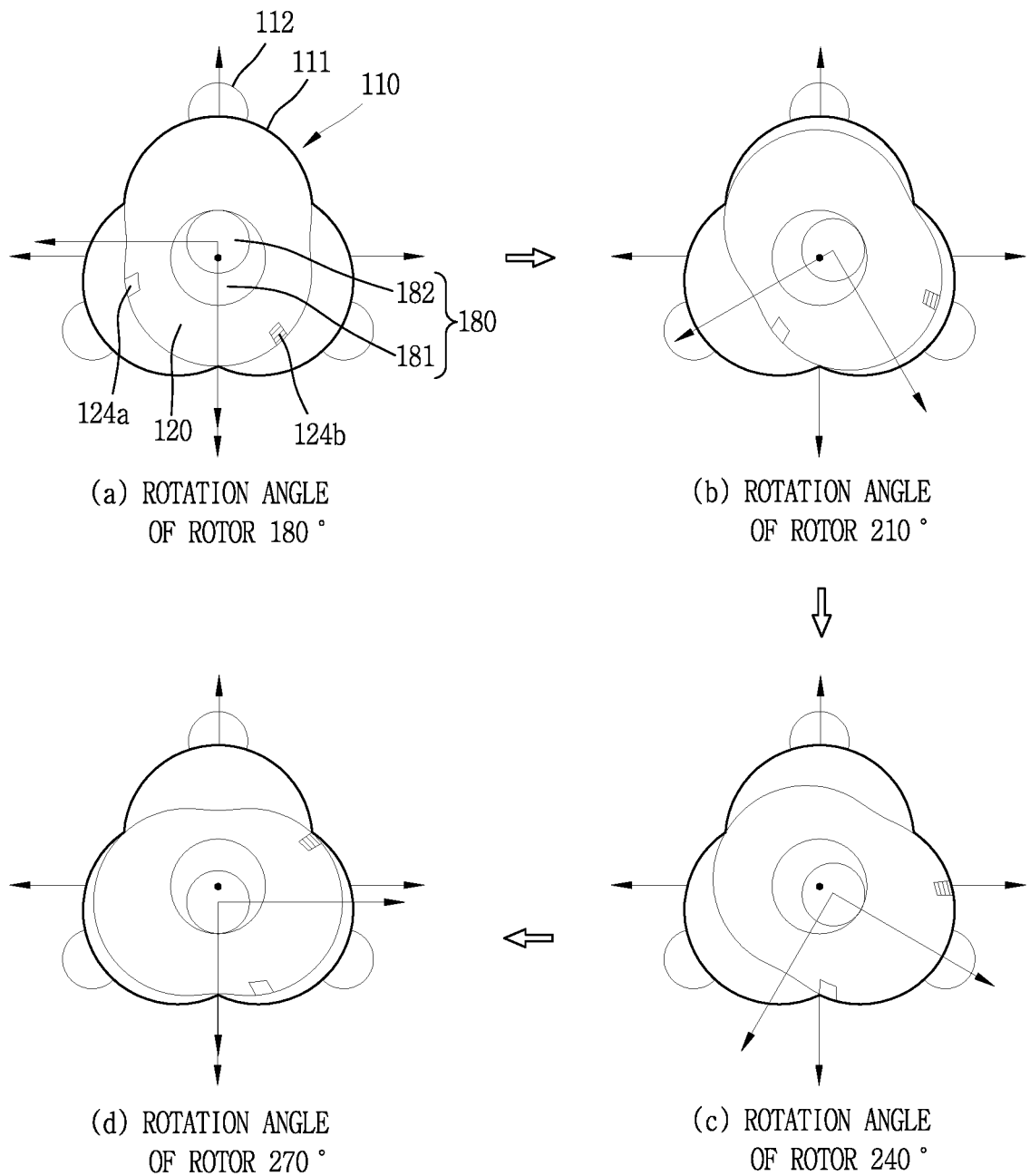
FIG. 7 is a conceptual view illustrating an explosion process inside the rotary engine illustrated in FIG. 3.

Next, referring to FIG. 7, the explosion (expansion) process is carried out while the rotation angle of the rotor 120 changes from 180° to 270°. The combustion process which has started at the end of the previous compression process is completely ended at the beginning of the explosion process.

During these processes, it should be noticed that the introduction of the mixed gas is executed as much as a volume corresponding to a state that the rotation angle of the rotor 120 is 120°, namely, a state that the rotor 120 rotates by 240° in this drawing, but the expansion process is carried out until the rotation angle of the rotor 120 is 270° at which a greater volume is formed.

Figure 8:
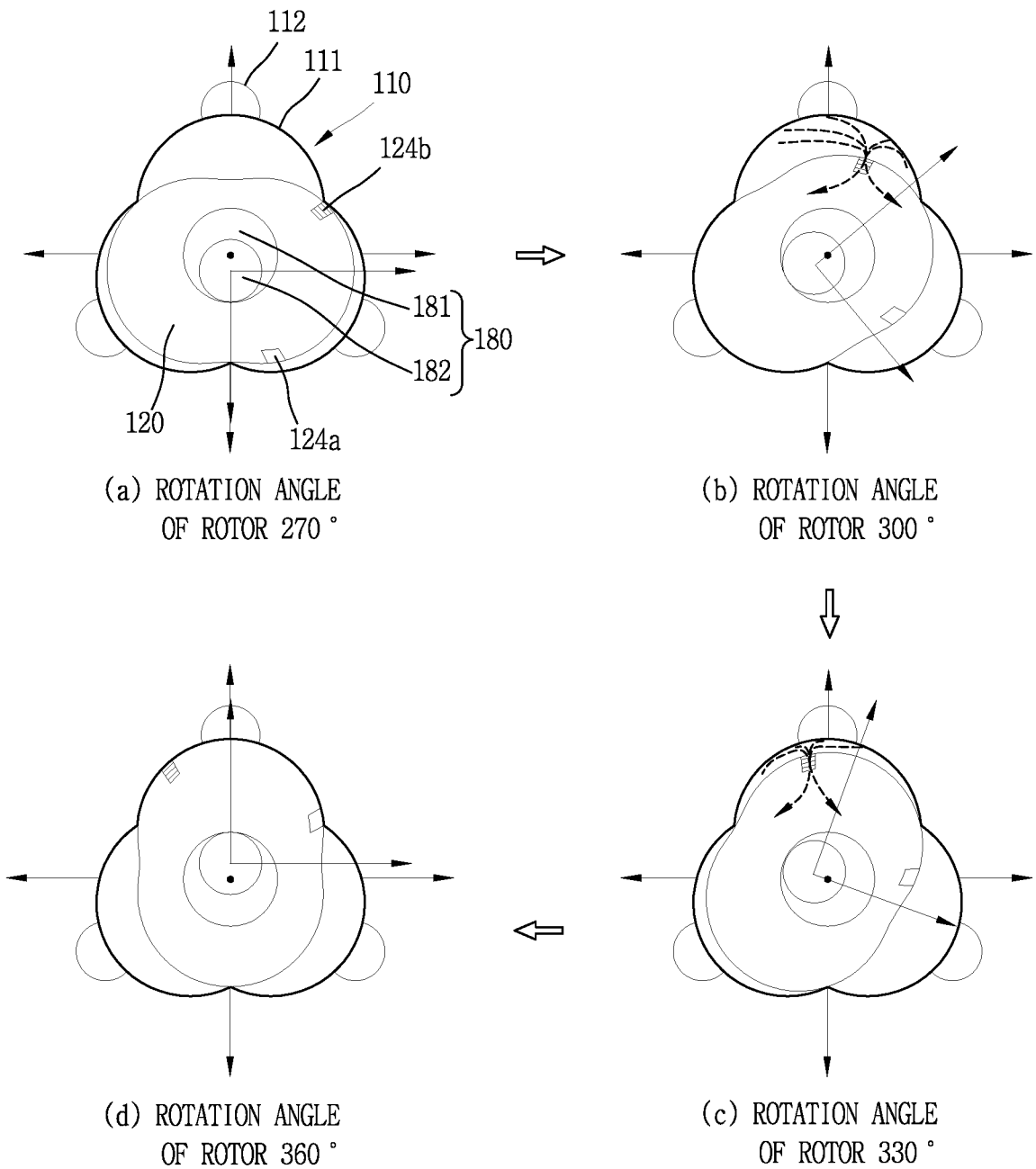
FIG. 8 is a conceptual view illustrating an exhaust process inside the rotary engine illustrated in FIG. 3.

Next, referring to FIG. 8, the exhaust process is carried out while the rotation angle of the rotor 120 changes from 270° to 360°. Generated exhaust gas is discharged through the exhaust port 124b while the rotor 120 rotates from 270° to 360° in the counterclockwise direction.

The foregoing description has been given of the structure and operation of the rotary engine 100 according to the present invention. Hereinafter, a lubrication unit 190 of the rotary engine 100 of the present invention will be described with reference to FIG. 9.

Figure 9:
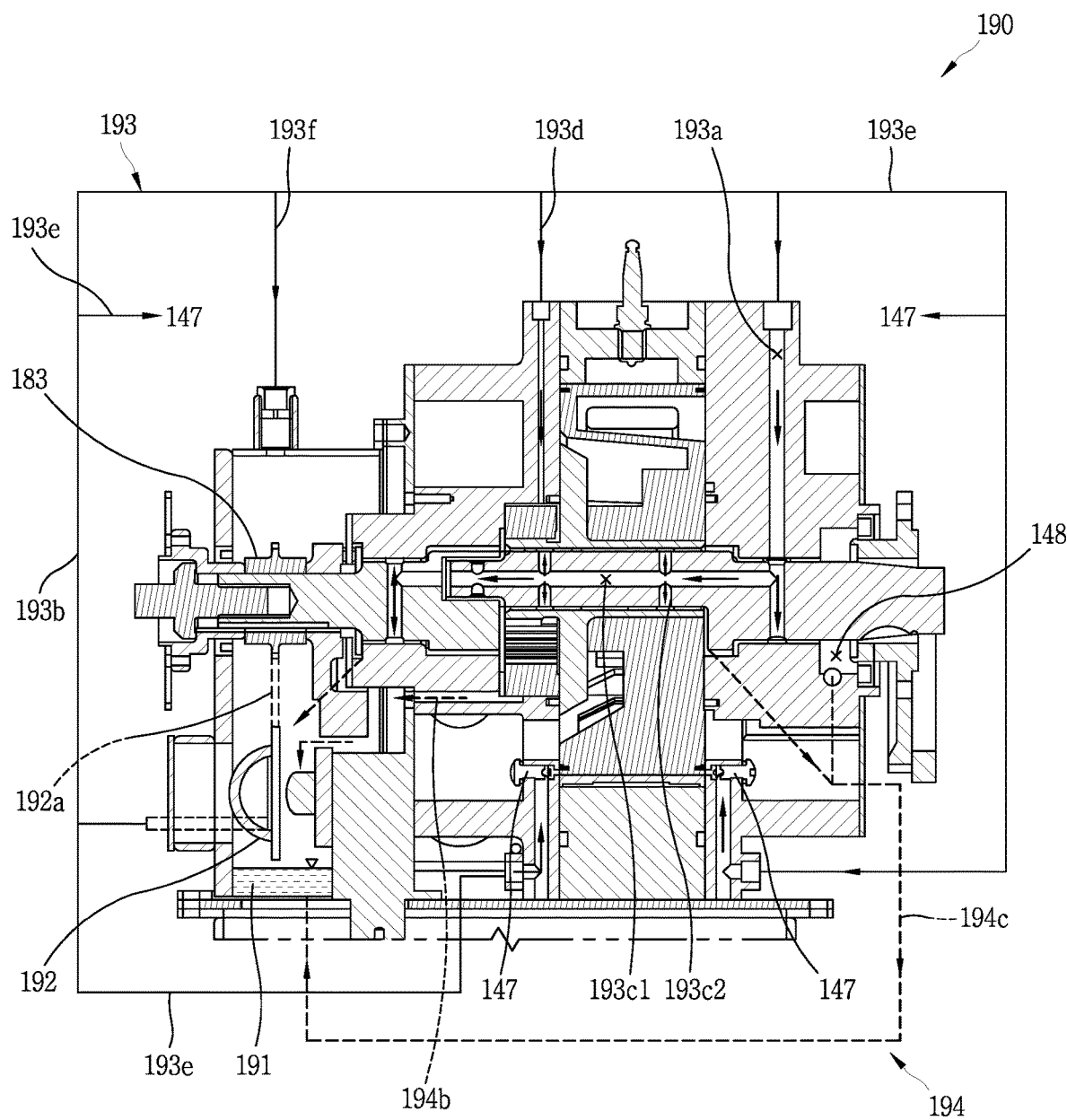
FIG. 9 is a conceptual view illustrating a lubricating unit provided in the rotary engine illustrated in FIG. 1.

FIG. 9 is a conceptual view illustrating a lubrication unit 190 provided in the rotary engine 100 illustrated in FIG. 1. Also, FIG. 10 is an enlarged view of an area A illustrated in FIG. 1.

Figure 10:
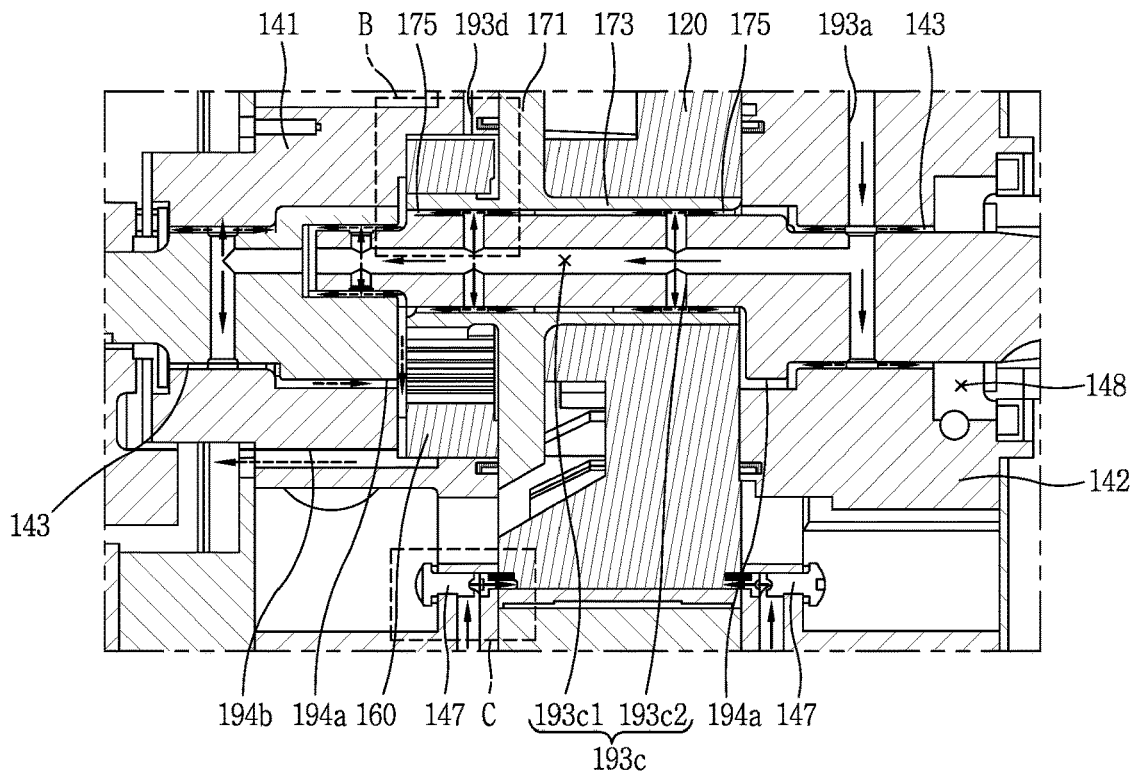
FIG. 10 is an enlarged view of an area A illustrated in FIG. 1.

Referring to FIGS. 9 and 10, the housing covers 141 and 142 of the present invention are provided respectively with bearing portions 143 for supporting the shaft portion 181 of the crank shaft 180.

Specifically, each of the bearing portions 143 may be a journal bearing having a cylindrical shape. That is, an outer circumferential surface of the bearing portion 143 may be fixed to the housing cover 141, 142 and an inner circumferential surface of the bearing portion 143 may support the shaft portion 181 to be rotatable. In order to support the shaft portion 181, an oil film may be formed on the inner circumferential surface of the bearing portion 143 by oil supplied by a lubricating unit 190 to be described later.

The rotary engine 100 of the present invention further includes a lubricating unit 190. The lubrication unit 190 includes an oil pan 191, an oil pump 192, and an oil supply passage 193. These respective components serve to store oil, pump the oil, and supply the oil to the bearing portion 143 and the like.

In the embodiment illustrated in FIG. 9, housing covers located at an intake side may include the intake-side cover 141 and an oil storage cover 150. At this time, the intake hole 141*a* may be formed on the rear surface of the intake-side cover 141 which is coupled to face the rotor 120, and the oil pump 192 may be mounted on the front surface which is opposite to the rear surface.

The oil storage cover 150 covers the front surface of the intake-side cover 141 to accommodate the oil pump 192. The oil pan 191 in which oil is filled may be provided on a bottom surface of a space which is formed by the oil storage cover 150 and the intake-side cover 141. The oil pan 191 and the oil pump 192 may be connected to each other by a pipe or a tube (not illustrated) through which oil is pumped up. An oil strainer (not illustrated) for filtering oil may further be provided at an end portion of the pipe or tube in a manner of being sunk in the oil pan 191.

The oil pump 192 may be, for example, a trochoid pump that pumps up oil by an eccentric rotation of a rotating body. In particular, as illustrated in FIG. 9, the oil pump 192 may be spaced apart from the crankshaft 180 to be rotated in parallel with the crankshaft 180. A chain gear 183 may be mounted on the outer circumferential surface of the crankshaft 180, and the trochoid pump and the crankshaft 180 may be connected to each other by a chain member 192*a*. Accordingly, rotational force generated in the crankshaft 180 can be transferred to the trochoid pump in response to the operation of the rotary engine 100 of the present invention.

The oil supply passage 193 may be connected in a manner that the oil pumped up by the oil pump 192 is supplied to the bearing portion 143. That is, one end of the oil supply passage 193 may be connected to a discharge side of the oil pump 192 and another end thereof may be located at a position adjacent to the bearing portion 143. The detailed structure of the oil supply passage 193 will be described later.

The lubricating unit 190 operates in a manner that an operation of the oil pump 192 is started in response to the driving force being generated in the crankshaft 180 and the oil filled in the oil pan 191 is supplied to the bearing portion 143 through the oil supply passage 193. This may result in supplying sufficient oil to the bearing portion which may be implemented as the journal bearing. Particularly, the bearing portion 143 can be lubricated even if the bearing portion 143 is positioned so as not to be exposed to the mixture of fuel and air.

In this manner, the lubricating unit 190 further provided in the rotary engine 100 of the present invention may allow oil to be supplied more directly to the bearing portion 143, unlike the related art case of supplying oil contained at a low ratio in the mixture. Therefore, oil for lubrication can be used more effectively, and possibility that the combustion efficiency of the engine is lowered can be reduced owing to the oil contained in the mixture.

In addition, by the lubricating unit 190 of the present invention, the bearing portion 143 of the present invention may be implemented as the journal bearing as mentioned above. If the journal bearing can be applied instead of a ball bearing or a needle bearing, an area of the bearing portion supporting the crankshaft 180 may be greatly enlarged. This difference may contribute to extending lifespan of the bearing portion 143, and additionally, the rotary engine 100 of the present invention can be made larger in size and larger in capacity. Unlike the case where an outer circumferential side and an inner circumferential side of the ball bearing are fixed, the bearing portion 143 formed of the journal bearing is fixed to the housing cover 141, 142 only on the outer circumferential side thereof, which facilitates replacement of the bearing portion 143.

The lubricating unit 190 of the present invention may be constructed in a manner that the oil pan 191 and the oil pump 192 are located in a space formed by the intake-side cover 141 and the oil storage cover 150. That is, the lubricating unit 190 may be integrally formed with the housing and the housing cover 141, 142, which may result in simply implementing the structure of the rotary engine 100 of the present invention having the lubricating unit 190.

On the other hand, the oil pump 192 may operate in cooperation with the crankshaft 180 by the chain member 192*a*. As a result, the oil pump 192 can be operated without any separate driving means. In addition, the oil pump 192 may vary to increase an oil supply as an output of the engine is increased, thereby implementing a lubrication effect which is variable to correspond to the output.

Hereinafter, description will be given of a passage configuration allowing oil to be supplied from the oil pump 192 to the bearing portion 143 along the oil supply passage 193, with reference to FIGS. 9 and 10.

The oil supply passage 193 provided herein may include a housing passage 193*a* and a supply tube 193*b*. The housing passage 193*a* is a passage penetrating through the housing cover 141, 142, and the supply tube 193*b* has a shape of an external passage formed at outside of the housing 110 and the housing cover 141, 142.

Specifically, the housing passage 193*a* may be formed to penetrate through the housing cover 141, 142. For example, the housing passage 193*a* may be positioned such that one end portion thereof is exposed to an outer surface of the housing cover 141, 142 and another end portion thereof is adjacent to the bearing portion 143. As illustrated in FIG. 9, the housing passage 193*a* may be formed to straightly penetrate through the exhaust-side cover 142 in a radial direction of the crankshaft 180. At this time, the another end portion of the housing passage 193*a* may be brought into contact with an outer circumferential surface of the bearing portion 143. However, since oil must be supplied to an inner circumferential surface of the bearing portion 143, the bearing portion 143 may be provided with a hole through which an outer circumferential side and an inner circumferential side thereof communicate with each other.

The supply tube 193*b* may be formed outside the housing and the housing cover 141, 142 in a manner that the oil pump 192 and the housing passage 193*a* communicate with each other. That is, one end portion of the supply tube 193*b* may be connected to a discharge side end portion of the oil pump 192, and another end portion thereof may be connected to a portion of the housing passage 193*a* which is exposed to the outer surface of the housing cover 141, 142.

As described above, since the oil supply passage 193 is formed by the combination of the housing passage 193a and the supply tube 193b, oil can be supplied along a separate passage without using the flow of the mixture. Further, oil can be cooled by heat-exchange with external air in the supply tube 193b. Thereafter, the oil can be introduced into the housing passage 193a and flow therealong to additionally cool the housing cover 141, 142.

On the other hand, the oil supply passage 193 may further include a shaft passage 193c as illustrated in detail in FIG. 10. The shaft passage 193c serves to supply oil between the bearing portions 143 at two places, which are formed on the intake-side cover 141 and the exhaust-side cover 142, respectively.

In the rotary engine 100 of the present invention, the bearing portion 143 may be formed on each of the intake-side cover 141 and the exhaust-side cover 142 to support the crankshaft 180 by which driving force is generated. At this time, the housing passage 193a may be separately formed in each of the bearing portions 143. However, as illustrated in this embodiment, the housing passage 193a provided in one bearing portion 143 may alternatively be provided with the shaft passage 193c connected thereto such that oil can be supplied to another bearing portion 143.

Concretely, the shaft passage 193c may be formed through the crankshaft 180 in a manner that one end thereof communicates with the housing passage 193a and another end thereof is positioned adjacent to the bearing portion 143. As illustrated in FIG. 10, when the housing passage 193a is formed in the exhaust-side cover 142, one end of the shaft passage 193c may communicate with the housing passage 193a in the vicinity of the bearing portion 143 mounted on the exhaust-side cover 142. The another end of the shaft passage 193c may be positioned adjacent to the bearing portion 143 mounted on the intake-side cover 141. As a result, the shaft passage 193c may be formed so that both ends thereof are positioned on the bearing portion 143 of the exhaust-side cover 142 and the bearing portion 143 of the intake-side cover 141, respectively.

The shaft passage 193c may be provided with an axial hole 193c1 and radial holes 193c2 that are formed through the crankshaft 180. The axial hole 193c1 extends in the axial direction of the crankshaft 180 and the radial holes 193c2 communicate with the axial hole 193c1 in an intersecting manner. In particular, each of the radial holes 193c2 may be formed such that an end portion thereof is formed on the outer circumferential surface of the crankshaft 180 to be adjacent to the bearing portion 143.

The process of supplying oil to the bearing portion 143 through the oil supply passage 193 described above with reference to FIGS. 9 and 10 is summarized as follows.

First, when the cycle of intake, combustion, and exhaust of the rotary engine 100 of the present invention is started, a rotary motion of the crankshaft 180 is started. Then, the oil pump 192 starts to be operated by receiving rotational force through the chain member 192a connected to the crankshaft 180. The oil pump 192 pumps up oil filled in the oil pan 191 toward the oil supply passage 193.

The pumped oil flows along the supply tube 193b. Oil heated in the rotary engine 100 may be cooled by heat-exchange with external air while flowing through the supply tube 193b. The oil that has passed through the supply tube 193b is supplied to the housing passage 193a.

In this embodiment, the housing passage 193a is formed in the exhaust-side cover 142. Oil flows through the exhaust-side cover 142 in the radial direction of the crankshaft 180, and is supplied to the inner circumferential surface side of the bearing portion 142b provided on the exhaust-side cover 142. Accordingly, the bearing portion 142b formed on the exhaust-side cover 142 can be lubricated.

Next, the oil flows toward the bearing portion 143 formed on the intake-side cover 141 along the shaft passage 193c. The oil may flow along the radial hole 193c2 and the axial hole 193c1 to be supplied to the inner circumferential surface of the bearing portion 143 of the intake-side cover 141, thereby forming a lubricating surface.

As illustrated in this embodiment, the oil supply passage 193 includes the shaft passage 193c so as to share the housing passage 193a penetrating through the exhaust-side cover 142, such that oil can be supplied even to the bearing portion 141b of the intake-side cover 141. In addition, since oil flows through the shaft passage 193c, the crankshaft 180 which is difficult to be exposed to mixture can be cooled.

On the other hand, as illustrated in FIG. 10, a rotor gear 170 and an eccentric bearing 175 are provided between the rotor 120 and the crankshaft 180, and oil may be supplied even to the eccentric bearing 175 by the shaft passage 193c.

Referring to FIGS. 2 and 10, the rotary engine 100 according to the present invention may further include a rotor gear 170. The rotor gear 170 serves to realize the eccentric rotation of the rotor 120 by being fixed to the rotor 120 and engaged with a guide gear 160 to be described later.

The rotor gear 170 may include a flange portion 171, a gear portion 172, and a boss portion 173. The flange portion 171 may be formed in a disk shape extending in the radial direction of the crankshaft 180. The flange portion 171 may be interposed between the rotor 120 and the housing cover (the intake-side cover 141 in this embodiment) and fixed to the rotor 120.

The boss portion 173 may extend from the flange portion 171 in the axial direction of the crankshaft 180. As illustrated in FIG. 10, the boss portion 173 may extend rearward from the flange portion 171 to be interposed between the rotor 120 and the crankshaft 180.

The gear portion 172 may protrude from the flange portion 171 toward the intake-side cover 141 and may be provided with saw teeth on its outer circumferential surface along a circumferential direction of the crankshaft 180. The gear portion 172 may be engaged with the guide gear 160 mounted on the housing cover 141. Specifically, the intake-side cover 141 may be provided with a mounting portion 144 which is recessed into a surface thereof facing the rotor 120, and the guide gear 160 in an annular shape having saw teeth along its inner circumferential surface to be engaged with the gear portion 172 may be fixed to the mounting portion 144. The eccentric rotation of the rotor 120 described above can be guided by the engagement between the guide gear 160 and the gear portion 172.

The rotor gear 170 rotatably fixed to the rotor 120 may be provided with an eccentric bearing 175 provided on an inner circumferential surface thereof. The eccentric bearing 175 may be slidable relative to the crankshaft 180 and may be made of a cylindrical journal bearing, similar to the bearing portion 143. As illustrated in FIG. 10, the eccentric bearing 175 may be provided in plurality disposed with being spaced apart from each other.

As described above, the oil supply passage 193 of the lubricating unit 190 may include the supply tube 193b, the housing passage 193a, and the shaft passage 193c. At this time, the shaft passage 193c may penetrate through the crankshaft 180 in the axial direction so as to pass through the rotor 120. Therefore, the shaft passage 193c may be branched so as to supply oil to the eccentric bearing 175.

In order to supply oil to the eccentric bearing 175, the radial hole 193c2 as described above may also be formed at a position adjacent to the eccentric bearing 175. As illustrated in FIG. 10, a plurality of radial holes 193c2 may be formed at positions, on which the plurality of eccentric bearings 175 are mounted, to communicate with the axial hole 193c1 in an intersecting manner.

The lubricating unit 190 of the present invention may supply oil even to the eccentric bearing 175 formed along the crankshaft 180 using the above structure. That is, oil can be supplied to the bearing portions 143 at two positions and the eccentric bearings 175 at two positions through the axial passage 193c penetrating through the crankshaft 180, thereby implementing an integrated lubrication.

Furthermore, the oil supply passage 193 of the present invention may further be provided with a gear passage 193d for supplying oil even to the guide gear 160 and the gear portion 172. As illustrated in FIGS. 1 and 9, the gear passage 193d may be formed through the intake-side cover 141 on which the guide gear 160 is seated. The gear passage 193d may be formed through the intake-side cover 141 in the radial direction of the crankshaft 180 such that an end portion thereof can be located adjacent to an outer circumferential surface of the guide gear 160.

Oil can supplied to saw-teeth surfaces of the guide gear 160 and the gear portion 172 along the gear passage 193d, thereby reducing abrasion and noise of the guide gear 160, the housing cover 141, 142 and the rotor gear 170.

Figure 11:
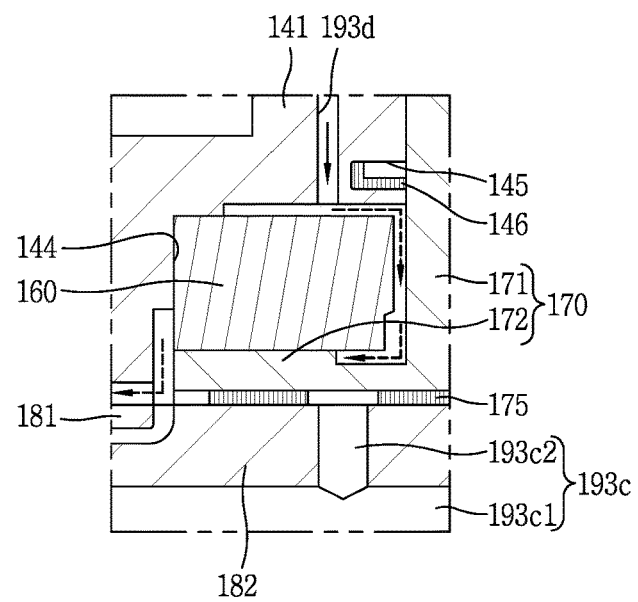
FIG. 11 is an enlarged view of an area B illustrated in FIG. 10.

In more detail, FIG. 11 is an enlarged view illustrating an area B illustrated in FIG. 10. The guide gear 160 which is provided with saw teeth on its inner circumferential surface to be engaged with the gear portion 172. Accordingly, it is necessary to ensure a passage along which oil supplied to the outer circumferential surface of the guide gear 160 through the gear passage 193d can flow toward the inner circumferential surface of the guide gear 160. Referring to FIG. 11, oil may flow through a rear surface of the guide gear 160, which faces the flange portion 171 of the rotor gear 170. During the operation of the rotary engine 100 of the present invention, since the front surface of the flange portion 171 and the rear surface of the guide gear 160 are frictionally rotated relative to each other, it is preferable that the oil passes through this portion so as to additionally form an oil lubricating surface.

Particularly, a height of the guide gear 160 (the thickness in the axial direction of the crankshaft 180) may be formed smaller than a recessed depth of the mounting portion 144 (a height in the axial direction of the crankshaft 180) by 2 mm or less. Alternatively, the height of the guide gear 160 and the recessed depth of the mounting portion 144 may be made equal to each other in consideration of an assembly tolerance and the like. Accordingly, a volume of a remaining space within the mounting portion 144 is reduced, and thus an oil surface is sufficiently ensured on a frictional surface formed between the housing cover 141, 142 and the flange portion 171.

Figure 12:
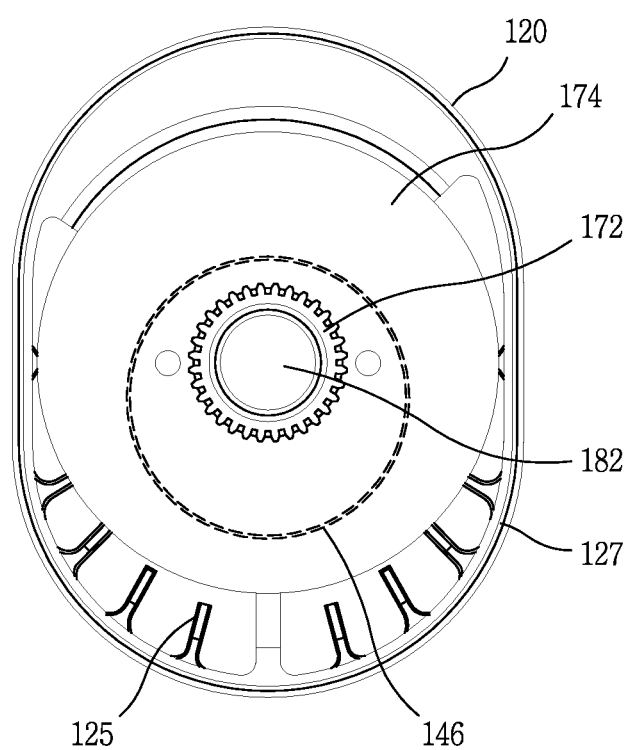
FIG. 12 is a conceptual view illustrating a positional relationship between an oil sealing member and a rotor gear.

On the other hand, FIG. 12 is a conceptual view illustrating a positional relationship between the oil sealing member 146 and the rotor gear 170. Referring to FIGS. 10 and 12, the housing cover 141, 142 of the present invention may include a sealing groove 145 and an oil sealing member 146. The sealing groove 145 and the oil sealing member 146 are configured to prevent a leakage of oil supplied to the crankshaft 180 and the bearing portion 143 and further to the eccentric bearing 175 and the gear portion 172.

As illustrated in FIG. 10, the sealing groove 145 may be formed on each of the intake-side and exhaust-side covers 141 and 142. The intake-side cover 141 may be provided with the sealing groove 145 formed on a rear surface thereof which faces the flange portion 171 of the rotor gear 170. The sealing groove 145 may be recessed in a thickness direction as the axial direction of the crankshaft 180 and extend to surround the crankshaft 180 and the guide gear 160 in the circumferential direction. The exhaust-side cover 142 may be provided with the sealing groove 145 formed on a front surface thereof which faces the rear surface of the housing.

In addition, the oil sealing member 146 may be inserted into the sealing groove 145. The oil sealing member 146 may be disposed to come in contact with the front surface of the flange portion 171 or the rear surface of the housing 110. As illustrated in FIGS. 10 and 12, the gear portion 172 of the rotor gear 170, the guide gear 160 engaged with the gear portion 172, and the crankshaft 180 may be located within a circle formed by the oil sealing member 146.

The oil sealing member 146 may restrict the oil that is supplied intensively around the crankshaft 180 from being leaked in the radial direction of the crankshaft 180 along the front and rear surfaces of the rotor 120. Accordingly, the oil supplied through the oil supply passage 193, separately from the mixture, can be prevented from being mixed with the mixture due to being leaked to the lobe accommodating portion 111 or the like during the lubrication.

Figure 13:
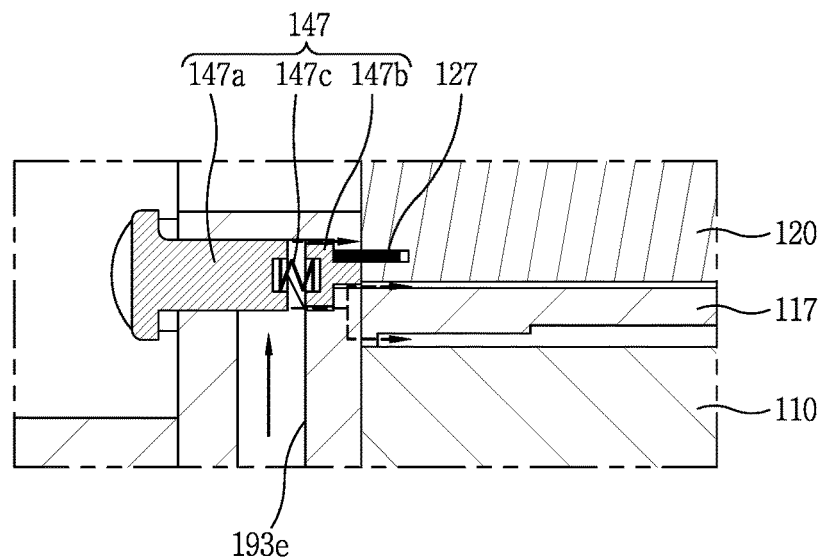
FIG. 13 is an enlarged view of an area C illustrated in FIG. 10.
Figure 14:
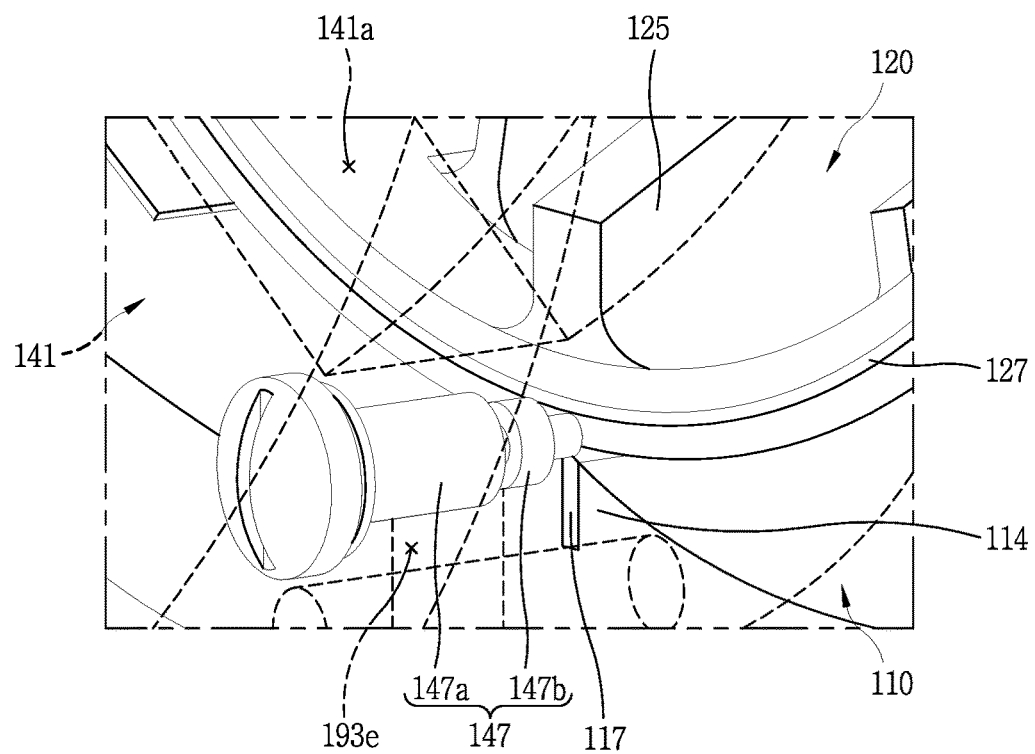
FIG. 14 is a perspective view illustrating an inserted position of a button seal illustrated in FIG. 13.

FIG. 13 is an enlarged view of an area C illustrated in FIG. 9, and FIG. 14 is a perspective view illustrating an inserted position of a button seal 147 illustrated in FIG. 13. Hereinafter, description will be given of a lubricating structure of supplying oil to a button seal 147, a side seal 127, and an apex seal 117, which are provided in the rotary engine 100 of the present invention, with reference to FIGS. 9, 13 and 14.

As described above, the rotary engine 100 according to this embodiment includes the three lobe accommodating portions 111 and the two lobes 120' and 120". At this time, the housing 110 has peak portions 114 protruding between the adjacent lobe accommodating portions 111 toward the crankshaft 180. Three peak portions 114 are formed between the adjacent lobe accommodating portions 111 of the three lobe accommodating portions 111, as illustrated in FIG. 3. And, as illustrated in FIGS. 5 and 8, during the operation of the rotary engine 100 of the present invention, the peak portions 114 are always kept in contact with the lobes 120' and 120" so as to cause friction. That is, the mixed air in two adjacent lobe accommodating portions 111 are subjected to intake→compression→explosion→exhaust processes in a state of being isolated from each other by the peak portion 114.

In order to ensure the isolation between the adjacent lobe accommodating portions 111 and the isolation between the first and second storage portions 123a and 123b and the lobe accommodating portions 111, the rotary engine 100 according to the present invention is provided with the side seal 127, the apex seal 117, and the button seal 147.

As illustrated in FIGS. 13 and 14, the side seal 127 may protrude from both front and rear surfaces along the circumference of the rotor 120. The side seal 127 may isolate the first and second storage portions from the lobe accommodating portions 111 within the rotor 120.

The apex seal 117 protrudes from an end of the peak portion 114 to come in contact with the rotor 120, and extend in a thickness direction of the rotor 120. The apex seal 117 may isolate the lobe accommodating portions 111 from each other.

Here, the button seal 147 is further provided to seal a gap between the side seal 127 and the apex seal 117. As illustrated in FIGS. 13 and 14, the button seal 147 is located at a position spaced from each of the intake hole 141a and the exhaust hole 142a in the radial direction of the crankshaft 180. The button seal 147 is inserted into the housing cover 141, 142 to press the surface of the rotor 120 between the side seal 127 and the apex seal 117.

As illustrated in FIGS. 9 and 13, the oil supply passage 193 provided in the lubricating unit 190 of the present invention may be provided with a seal passage 193e along which oil is supplied to the button seal 147. The seal passage 193e may be formed through the inside of the housing cover 141, 142 and a part of the supply tube 193b may be branched to be connected to the seal passage 193e. An end portion of the seal passage 193e may be positioned adjacent to the button seal 147, as illustrated in FIG. 13.

The button seal 147, as illustrated in FIG. 13, may include a body portion 147a, a pressing portion 147b, and an elastic portion 147c. The body portion 147a may be fixed to the housing cover 141, 142 and the pressing portion 147b may be formed to press the surface of the rotor 120. The pressing portion 147b and the body portion 147a may be connected to each other by the elastic portion 147c, and the elastic portion 147c may provide force for pressing the pressing portion 147b toward the surface of the rotor 120.

At this time, the end portion of the seal passage 193e may be positioned to communicate with a space between the body portion 147a and the pressing portion 147b of the button seal 147. Oil supplied to the seal passage 193e may be introduced into the space between the body portion 147a and the pressing portion 147b, and then flow along a gap between the pressing portion 147b and the housing cover 141, 142, so as to be supplied to the end portion of the pressing portion 147b at which the pressing portion 147b and the rotor 120 come in contact with each other.

Oil that has lubricated the button seal 147 may also further flow toward the rotor 120 to lubricate the side seal 127 and the apex seal 117. As illustrated in FIG. 13, a part of oil may flow toward the side seal 127 and another part of the oil may be supplied to the surface where the apex seal 117 and the rotor 120 come in contact with each other. Another part of the oil may flow between the apex seal 117 and the housing cover 141, 142.

The lubricating unit 190 of the present invention may directly supply oil to the button seal 147, the side seal 127, and the apex seal 117 through such paths. Therefore, durability of frictional surfaces rubbed for sealing during the operation can be improved, and the leakage of the mixture can be effectively prevented.

The foregoing description has been given of the structure in which oil is directly supplied to the bearing portion 143, the eccentric bearing 175, the rotor gear 170, and the button seal 147 by the lubricating unit 190 of the present invention. In addition, the oil supply passage 193 of the lubricating unit 190 according to the present invention may be configured to lubricate an operating portion of the oil pump 192 of the lubricating unit 190.

As illustrated in FIG. 9, the oil supply passage 193 may further include a pump passage 193f. The pump passage 193f may be connected to the oil storage cover 150 at an upper side of the chain member 192a to drop oil to the chain member 192a by gravity. One end portion of the pump passage 193f may be branched from the supply tube 193b, and another end portion may be disposed to communicate with the inner space of the oil storage cover 150 on an upper surface of the oil storage cover 150.

In addition, the trochoid pump may be located at a lower side of the crankshaft 180, or as illustrated in FIG. 9, the pump passage 193f, the chain gear 183, the chain member 192a, and the trochoid pump may be sequentially arranged from an upper side. One end portion of the pump passage 193f, in some cases, may be positioned to be adjacent to the chain member 192a through the oil storage cover 150.

The pump passage 193f may allow the oil to be supplied even to the chain gear 183 and the chain member 192a for operating the lubricating unit 190 itself and improve reliability of the operation of the lubricating unit 190.

The foregoing description has been given of the structure for supplying oil to each component of the rotary engine 100 of the present invention. Hereinafter, description will be given of an oil recovery passage 194 along which the supplied oil is recovered to the oil pan 191, with reference to FIG. 9.

As described above, the lubricating unit 190 of the present invention includes the oil pan 191, the oil pump 192, and the oil supply passage 193. Further, the lubricating unit 190 may further include an oil recovery passage 194 for guiding the oil supplied to the bearing portion 143, the eccentric bearing 175, the guide gear 160 or the gear portion 172 to the oil pan 191.

The oil recovery passage 194 may include a gap passage 194a formed on the outer circumferential surface of the crankshaft 180. That is, the gap passage 194a may be a portion where the outer circumferential surface of the crankshaft except for a portion covered with the bearing portion 143 and the eccentric bearing 175 is spaced apart from the housing cover 141, 142 or the boss portion 173. Oil primarily flowing from the bearing portion 143 or the eccentric bearing 175 may flow along the gap passage 194a.

Next, the oil recovery passage 194 may include a guide passage 194b. The guide passage 194b may communicate with the gap passage 194a and may be formed in the housing cover 141, 142 to guide oil to the oil pan 191. The guide passage 194b may be formed in a shape of a groove formed on the surface of the housing cover 141, 142 or in a shape of a hole penetrating through the housing cover 141, 142. That is, both end portions of the guide passage 194b may communicate with the gap passage 194a and the oil pan 191, respectively.

The oil recovery passage 194 may include a recovery tube 194c connected to outside of the housing cover 141, 142 or the housing to recover oil to the outside. For example, an oil drain space 148 may be formed in the housing cover 141, 142 to be adjacent to the bearing portion 143, and the recovery tube 194c may be formed such that the oil drain space 148 and the oil pan 191 communicate with each other.

As illustrated in FIG. 9, the oil drain space 148 may be a space adjacent to the bearing portion 143 formed in the exhaust-side cover 142. That is, the oil drain space 148 may be a recessed space in the inner circumferential surface of the exhaust side cover 142, which faces the crankshaft 180. Thus, the oil drain space 148 may accommodate oil which flows from the bearing portion 143 of the exhaust-side cover 142.

In addition, the recovery tube 194c may allow the oil recovered in the oil drain space 148 to return to the oil pan 191. A part of the recovery tube 194c may be made to penetrate through the exhaust-side cover 142. The remaining portion of the recovery tube 194c may extend to the outside of the housing cover 141, 142, so as to communicate with the oil pan 191 which is formed by the intake-side cover 141 or the oil storage cover 150.

As described above, when the oil recovery passage 194 is further formed, oil which is supplied to the bearing portion 143 and the like through the oil supply passage 193 to be used for lubrication can be recovered separately. Thus, a lubrication system can be implemented in which the recovered oil is circulated to be reused for lubrication. That is, an amount of oil wasted due to being scattered to the mixture or exhaust gas can be reduced.

The foregoing embodiments are merely given of those embodiments for practicing a rotary engine according to the present invention. Therefore, the present invention is not limited to the above-described embodiments, and it will be understood by those of ordinary skill in the art that various changes in form and details may be made therein without departing from the scope of the present invention.

What is claimed is:

1. A rotary engine comprising:
   a crankshaft;
   a housing including:
     N lobe accommodating portions arranged to surround the crankshaft, wherein N is a natural number equal to or greater than 3; and
     N combustion chambers, each combustion chamber communicating with a corresponding one of the lobe accommodating portions;
   a rotor eccentrically rotatable with respect to the crankshaft in the lobe accommodating portions, the rotor having N−1 lobes;
   a housing cover coupled to the housing so as to overlap the lobe accommodating portions, the housing cover having a bearing portion to rotatably support the crankshaft; and
   a lubricating system to supply oil to the bearing portion, the lubricating system including:
     an oil pan located in the housing cover to hold oil;
     an oil pump located adjacent the housing cover and configured to pump oil from the oil pan; and
     an oil supply passage having a first end connected to the oil pump and a second end adjacent to the bearing portion,
   wherein the housing cover includes:
   an intake-side cover having a plurality of intake holes on one surface of the intake-side cover coupled to the housing, the oil pump being mounted on another surface of the intake-side cover; and
   an oil storage cover coupled to the intake-side cover to accommodate the oil pump, the oil storage cover having a bottom surface defining the oil pan.

2. The rotary engine of claim 1, wherein the bearing portion is a journal bearing fixed to the housing cover and configured to form an oil film to support the crankshaft by receiving the oil from the oil pan.

3. The rotary engine of claim 1, wherein the oil pump is a trochoid pump spaced apart from the crankshaft, the trochoid pump being configured to pump oil by rotational force, and
   wherein the lubricating system further includes a chain member operatively connecting the trochoid pump and the crankshaft to each other so as to transfer a driving force from the crankshaft to the trochoid pump.

4. The rotary engine of claim 3, wherein the oil supply passage includes a pump passage connected to the oil storage cover above the chain member to allow oil to be provided to the chain member via gravity, and
   wherein the trochoid pump is positioned lower than the crankshaft.

5. The rotary engine of claim 1, wherein the oil supply passage includes:
   a housing passage extending through the housing cover such that a first end of the housing passage is exposed to an outer surface of the housing cover and a second end of the housing passage is the second end of the oil supply passage adjacent to the bearing portion; and
   a supply tube operatively connecting the oil pump to the first end of the housing passage.

6. The rotary engine of claim 1, wherein the oil supply passage comprises:
   a housing passage extending through the housing cover; and
   a shaft passage extending through the crankshaft such that a first end of the shaft passage operatively communicates with the housing passage and a second end of the shaft passage is the second end of the oil supply passage adjacent to the bearing portion.

7. The rotary engine of claim 6, wherein the shaft passage includes:
   an axial hole extending in an axial direction of the crankshaft; and
   radial holes intersecting the axial hole, the radial holes being located adjacent to the bearing portion.

8. The rotary engine of claim 1, further comprising a rotor gear, the rotor gear having:
   a flange portion located between the rotor and the housing cover, the flange portion being fixed to the rotor, and the flange portion having an outer circumferential surface; and
   a gear portion protruding from the flange portion toward the housing cover, the gear portion having saw teeth formed on the outer circumferential surface of the flange portion,
   wherein the housing cover includes:
   a mounting portion recessed into a surface of the housing cover facing the rotor; and
   a guide gear mounted on the mounting portion, the guide gear having saw teeth formed along an inner circumferential surface of the guide gear, and the saw teeth of the guide gear being configured to be engaged with the saw teeth of the gear portion.

9. The rotary engine of claim 8, wherein the oil supply passage includes a gear passage extending through the housing cover and adjacent to the guide gear.

10. The rotary engine of claim 1, wherein the housing cover includes:
    a sealing groove recessed into a surface of the housing cover facing the rotor, the sealing groove extending along a circumferential direction of the crankshaft; and
    an oil sealing member located in the sealing groove so as to restrict oil leakage in a radial direction of the crankshaft.

11. The rotary engine of claim 1, wherein the housing includes N peak portions protruding toward the crankshaft, each peak portion being located between two adjacent lobe accommodating portions so as to be in contact with the rotor,
    wherein the housing cover includes a button seal at each peak portion, each button seal being in contact with the rotor as the rotor rotates, and
    wherein the oil supply passage includes a seal passage extending through the housing cover adjacent to the button seals.

12. The rotary engine of claim 1, wherein the lubricating system includes an oil recovery passage to guide oil from the bearing portion to the oil pan.

13. The rotary engine of claim 12, wherein the oil recovery passage includes:
    a gap passage located between the housing cover and an outer circumferential surface of the crankshaft; and a guide passage operatively communicating with the gap passage, the guide passage located in the housing cover to guide oil to the oil pan.

14. The rotary engine of claim 12, wherein the housing cover includes an oil storage space recessed at an inner circumferential surface of the housing cover facing the crankshaft to store oil flowing from the bearing portion, and
wherein the oil recovery passage includes a recovery tube operatively connecting the oil storage space to the oil pan.

15. A rotary engine comprising:
a crankshaft;
a housing including:
   N lobe accommodating portions arranged to surround the crankshaft, wherein N is a natural number equal to or greater than 3; and
   N combustion chambers, each combustion chamber communicating with a corresponding one of the lobe accommodating portions;
a rotor eccentrically rotatable with respect to the crankshaft in the lobe accommodating portions, the rotor having N-1 lobes;
a housing cover coupled to the housing so as to overlap the lobe accommodating portions, the housing cover having a bearing portion to rotatably support the crankshaft;
a rotor gear, the rotor gear having:
   a flange portion located between the rotor and the housing cover, the flange portion being fixed to the rotor; and
   a boss portion extending from the flange portion and located between the rotor and the crankshaft, the boss portion having an inner circumferential surface;
an eccentric bearing rotatably supporting the crankshaft, the eccentric bearing being mounted on the inner circumferential surface of the boss portion; and
a lubricating system to supply oil to the bearing portion and the eccentric bearing, the lubricating system including:
   an oil pan located in the housing cover to hold oil;
   an oil pump located adjacent the housing cover and configured to pump oil from the oil pan; and
   an oil supply passage having a first end connected to the oil pump and a second end adjacent to the bearing portion and the eccentric bearing.

16. The rotary engine of claim 15, wherein the oil supply passage comprises:
a housing passage extending through the housing cover; and
a shaft passage extending through the crankshaft such that a first end of the shaft passage operatively communicates with the housing passage and a second end of the shaft passage is adjacent to the eccentric bearing.

17. The rotary engine of claim 15, wherein the lubricating system includes an oil recovery passage to guide oil from the bearing portion to the oil pan, the oil recovery passage including:
a gap passage located between an outer circumferential surface of the crankshaft and the boss portion; and
a guide passage operatively communicating with the gap passage, the gap passage extending through the housing cover to guide oil to the oil pan.

* * * * *